:::
United States Patent Office 2,871,242
Patented Jan. 27, 1959

---

2,871,242

PROCESS FOR THE PRODUCTION OF DIOXYDI-PHENYL-PYRIDYL-METHANES

Ernst Seeger and August Kottler, Biberach (Riss), Germany, assignors to Dr. Karl Thomae G. m. b. H., Biberach (Riss), Germany, a corporation of Germany No Drawing. Application March 21, 1956
Serial No. 572,836

Claims priority, application Germany March 22, 1955

5 Claims. (Cl. 260—295)

This application is a continuation-in-part of copending application Serial No. 342,716, filed March 16, 1953, now United States Patent No. 2,764,590.

This invention relates to a process for the production of dioxydiphenyl-pyridyl-methane compounds by a reaction between oxyphenyl-pyridyl-carbinols and phenols in the presence of a compound capable of tying up the water split off during the reaction.

More particularly, the present invention has as its object the production of dioxyphenyl-pyridyl-methanes having the general structural formula

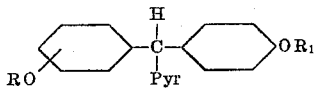

wherein R and $R_1$ are selected from the group consisting of hydrogen, alkyl and acyl radicals and Pyr represents a pyridyl radical, and their derivatives wherein the phenyl radicals and/or the pyridyl radical carry further substituent radicals selected from the group consisting of alkyl, aryl and aralkyl groups.

We have found that such dioxydiphenyl-pyridyl-methane compounds are obtained with excellent yields by subjecting oxyphenyl-pyridyl-carbinols, or their O-alkylated or O-acylated derivatives wherein the phenolic hydroxyl, alkoxy or acyloxy group is in the 2-, 3- or 4-position and which may carry further alkyl, aryl or aralkyl substituent radicals on the phenyl and/or pyridyl ring, to a condensation reaction with phenol or its derivatives which are unsubstituted in the p-position but substituted in one or more of the remaining positions by alkyl, aryl or aralkyl radicals, in the presence of a desiccating agent. The acylation or alkylation of any free hydroxyl groups in the starting materials or the end products may be carried out during the condensation reaction or subsequently thereto, whichever is desired.

The process according to the present invention makes it possible, for instance, to produce, in a very simple fashion, (4-hydroxy-4'-alkoxy)-pyridyl-methanes which are relatively difficult to produce by methods heretofore known.

Suitable desiccating agents for the condensation reaction are, for example, sulfuric acid, hydrochloric acid, phosphoric acid, aluminum chloride, zinc chloride and the like.

The above condensation reaction ordinarily readily proceeds at room temperature without heating or cooling of the reaction mixture, but if sulfuric acid is used as the desiccant, it may be advantageous to cool the reaction mixture to as low as −10° C. to counteract the heat of reaction evolved by the combination of the water and the sulfuric acid. Conversely, if phosphoric acid is used as the desiccant it may be necessary to warm the reaction mixture slightly, for example to about 100° C.

The condensation reaction may also, if desired, be carried out in an inert organic solvent medium, for example in the presence of benzene, toluene and the like. The end products, that is the dioxydiphenyl-pyridyl-methane compounds produced by the condensation reaction, may be acylated or alkylated as desired by conventional methods, or if the end product contains alkoxy groups attached to the phenyl radicals, they may be de-alkylated by any method customarily used for converting alkoxy groups into hydroxyl groups, for example as described in Examples XIII and XIV below.

The majority of the oxyphenyl-pyridyl-carbinols used as one of the starting materials in the above-disclosed reaction are well known compounds (Sperber et al., J. A. C. S., 73 (1951), p. 3856), and those analogous compounds which have not been specifically described in the prior art may be readily produced by reacting pyridine-aldehydes with the Grignard derivatives of the corresponding phenols.

The following examples will further illustrate the present invention and enable others skilled in the chemical arts to understand the invention more completely. We wish it to be understood, however, that we do not intend to limit our invention to the particular compounds or reaction conditions recited in these examples.

EXAMPLE I (4-hydroxy-4'-methoxy-diphenyl)-(pyridyl-2)-methane

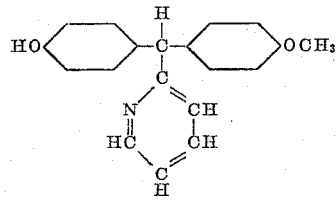

A mixture of 5 gm. (4-methoxy-phenyl)-(pyridyl-2)-carbinol and 10 gm. phenol was heated gently on a water bath until the solids were melted. Thereafter, 10 cc. concentrated sulfuric acid were added dropwise to the liquid mixture, accompanied by cooling and stirring. The acid reaction mixture was allowed to stand for several days and was then dissolved in water, adjusted to alkaline reaction with dilute sodium hydroxide and filtered. The filtrate was acidified to slightly acid reaction with dilute hydrochloric acid and neutralized with sodium carbonate, whereby a precipitate was formed. The precipitate was filtered off and recrystallized from methanol. The product, consisting of colorless crystals and weighing 5 gm., had a melting point of 156° C.

Proceeding analogously, but using 20 gm. anhydrous phosphoric acid as the desiccant, heating the acid reaction mixture to 50° C. for four hours, and thereafter allowing the mixture to stand for several days at room temperature, the same product was obtained with a yield of 4.5 gm.

Similarly, when 10 gm. zinc chloride or tin tetrachloride were used as the desiccant and the reaction mixture was heated to 50° C. for about one day, the above reaction product was obtained with similar yields.

EXAMPLE II (4-hydroxy-4'-methoxy-diphenyl)-(pyridyl-2)-methane 5 gm. (4-methoxy-phenyl)-(pyridyl-2)-carbinol and 7 gm. phenol were dissolved in 60 cc. benzene, and then 4 gm. aluminum chloride were added in small portions to the solution, accompanied by cooling. Stirring was continued for several hours and thereafter the reaction mixture was allowed to stand overnight. It was then acidified with hydrochloric acid, thoroughly shaken and again allowed to stand for a short period of time to permit the phase separation of the immiscible benzene. The benzene layer was then separated from the aqueous phase. The acid aqueous solution was made weakly alkaline with sodium hydroxide, filtered and acidified to weakly acid reaction with dilute acetic acid. The precipitate formed thereby was recrystallized from methanol. The yield of (4-hydroxy-4'-methoxy-diphenyl) - (pyridyl-2) - methane was 4.5 gm.

EXAMPLE III (4-hydroxy-4'-methoxy-diphenyl)-(6-methyl-pyridyl-2)-methane

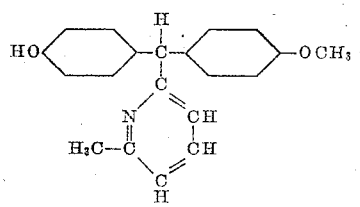

10 cc. concentrated sulfuric acid were added to a mixture of 5 gm. (4-methoxyphenyl)-(6-methyl-pyridyl-2)-carbinol and 8 gm. phenol, and the resulting reaction mixture was allowed to stand for several hours. Thereafter, the mixture was worked up as described in Example I. Upon recrystallization from methanol, colorless crystals having a melting point of 170–171° C. were obtained. Yield: 4 gm.

EXAMPLE IV (4-hydroxy-4'-methoxy-diphenyl)-(6-methyl-pyridyl-2)-methane

Hydrochloric acid gas was passed into a solution of 10 gm. (4-methoxy-phenyl)-(6-methyl-pyridyl-2)-carbinol and 20 gm. phenol in 120 cc. benzene, while cooling, until the solution became saturated with the gas. The reaction mixture was then allowed to stand for two days at room temperature. Thereafter, dilute hydrochloric acid was added, the acid mixture was thoroughly shaken and finally the benzene layer which separated from the solution was drawn off and discarded. Sodium carbonate was added to the hydrochloric acid solution which remained behind, whereby a precipitate was formed which was filtered off and recrystallized from ethanol. The yield of (4 - hydroxy - 4' - methoxy - diphenyl) - (6 - methyl-pyridyl-2)-methane was 12 gm.

EXAMPLE V (4,4'-dimethoxy-diphenyl)-(pyridyl-2)-methane

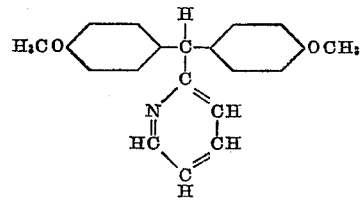

15 cc. concentrated sulfuric acid were slowly added to a mixture of 10 gm. (4-methoxy-phenyl)-(pyridyl-2)-carbinol and 10 gm. anisole while cooling and stirring the mixture. Thereafter, the reaction mixture was allowed to stand for two days at room temperature, and at the end of this time the reaction mixture was diluted with water and shaken with ether. The acid aqueous solution separated from the immiscible ether phase after a short time, whereupon the ether was drawn off and discarded. The acid aqueous phase was made alkaline with sodium hydroxide and several times shaken with ether. The several ether portions were combined, the solvent was removed therefrom, and the residue was distilled in vacuo. 9 gm. of an oily product having a boiling point of 200–203° C. at 0.15 mm. Hg was obtained.

EXAMPLE VI (4,4'-dimethoxy-diphenyl)-(6-methyl-pyridyl-2)-methane

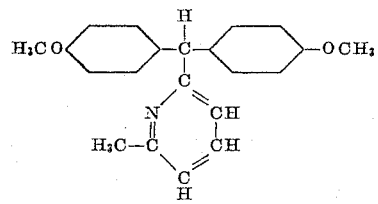

By following the procedure described in the preceding example, but adding the concentrated sulfuric acid to a mixture of 10 gm. (4-methoxy-phenyl)-(6-methyl-pyridyl-2)-carbinol and 10 gm. anisole, 8 gm. of the oily reaction product having a boiling point of 183–184° C. at 0.05 mm. Hg were obtained.

EXAMPLE VII (4-hydroxy-3-isopropyl-6-methyl-phenyl)-(4'-methoxy-phenyl)-(pyridyl-2)-methane

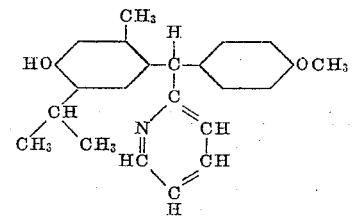

10 cc. concentrated sulfuric acid were slowly added to a mixture of 7.5 gm. thymol and 5 gm. (4-methoxy-phenyl)-(pyridyl-2)-carbinol, accompanied by stirring. After allowing the reaction mixture to stand for a short period of time, the solid product was dissolved in a 10% potassium hydroxide solution. Subsequently, the solution was acidified with dilute hydrochloric acid to weaky acid reaction, and finally neutralized with sodium carbonate. The precipitate formed thereby was filtered off, washed with water and recrystallized from a mixture of methanol and water. The colorless crystals obtained thereby had a melting point of 150 to 151° C. The yield was 5.5 gm.

EXAMPLE VIII (4-hydroxy-3-methoxy-4'-methoxy-diphenyl)-(pyridyl-2)-methane

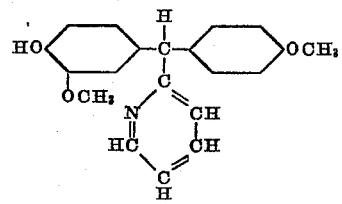

5 gm. (4-methoxy-phenyl)-(pyridyl-2)-carbinol and 6.5 gm. guaiacol were subjected to a condensation reaction and worked up as described in Example I. When recrystallized from ether, the reaction product had a melting point of 129° C. The yield was 4.5 gm.

EXAMPLE IX (4-hydroxy-3-methyl-4'-methoxy-diphenyl)-(pyridyl-2)-methane

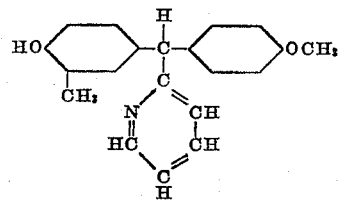

By condensing 5 gm. (4-methoxy-phenyl)-(pyridyl-2)-carbinol with 6 gm. o-cresol in the presence of sulfuric acid and working up the reaction product, as described in Example I, the above compound was obtained which, when recrystallized from methanol, had a melting point of 158° C. The yield was 4 gm.

EXAMPLE X

*(4-hydroxy-2-methyl-4'-methoxy-diphenyl)-(pyridyl-2)-methane*

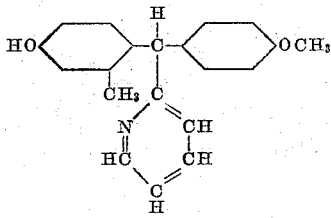

Using the same quantity of m-cresol instead of o-cresol, but proceeding substantially as in the preceding example, the above reaction product having a melting point of 206–208° C. after recrystallization from methanol was formed. The yield was 4.8 gm.

EXAMPLE XI

*(4-acetoxy-4'-methoxy-diphenyl)-(pyridyl-2)-methane*

A mixture of 5 gm. (4-hydroxy-4'-methoxy-diphenyl)-(pyridyl-2)-methane, 5 gm. sodium acetate and 20 cc. acetic acid anhydride was heated on a water bath for about three hours. After cooling, the reaction mixture was poured into water, whereby an oily substance was formed which was immiscible with water and separated out of the aqueous phase. The oil was drawn off and dissolved in ether. Thereafter, the ether solution was first shaken with a 2% solution of sodium hydroxide and then with water, whereupon the solvent was evaporated therefrom. The residue was distilled in vacuo, yielding 4.5 gm. of an oily product having a boiling point of 214–217° C. at 0.6 mm. Hg.

EXAMPLE XII

*(4,4'-dihydroxy-diphenyl)-(pyridyl-2)-methane*

3 gm. (4,4'-dimethoxy-diphenyl)-(pyridyl-2)-methane as obtained according to the procedure of Example V, for example, were refluxed for about one hour with 30 cc. of a 48% hydrobromic acid solution. The resulting solution was then diluted with water and neutralized with sodium carbonate. The precipitate formed thereby was filtered off on a vacuum filter and recrystallized from methanol. The reaction product had a melting point of 254° C. The yield was 2 gm.

EXAMPLE XIII

*(4,2'-dihydroxy-diphenyl)-(pyridyl-2)-methane*

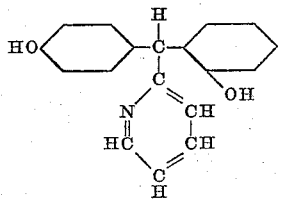

(a) Production of (2-methoxy-phenyl)-(pyridyl-2)-carbinol used as starting material:

A solution of 14 gm. pyridine-2-aldehyde in ether was added dropwise to a Grignard mixture consisting of 5 gm. magnesium shavings and 37.5 gm. o-bromo-anisole, accompanied by stirring. After all of the aldehyde was added, the resulting mixture was refluxed for about one half hour. The solution was then allowed to cool, acidified to weakly acid reaction with dilute hydrochloric acid and allowed to stand for a short period of time to permit the ether phase to separate from the aqueous phase. The ether phase was drawn off and discarded. The remaining aqueous phase was admixed with ammonia, whereby (2-methoxy-phenyl)-(pyridyl-2)-carbinol separated out and soon solidified. The precipitate was filtered off on a vacuum filter, washed with water and finally recrystallized from ethyl acetate. The recrystallized product had a melting point of 84° C. The yield was 7 gm.

(b) production of (4-hydroxy-2'-methoxy-diphenyl)-(pyridyl-2)-methane:

8 cc. concentrated sulfuric acid were slowly added to a mixture of 5 gm. phenol and 5 gm. (2-methoxy-phenyl)-(pyridyl-2)-carbinol, accompanied by cooling and stirring. The resulting reaction mixture was then allowed to stand for about one day, and was thereafter worked up as described in Example I. The reaction product, recrystallized from methanol, had a melting point of 221° C. The yield was 4 gm.

(c) Conversion of (4-hydroxy-2'-methoxy-diphenyl)-(pyridyl-2)-methane into (4,2'-dihydroxy-diphenyl)-(pyridyl-2)-methane:

A mixture of 2 gm. (4-hydroxy-2'-methoxy-diphenyl)-(pyridyl-2)-methane and 25 cc. of a 48% hydrobromic acid solution was heated and thereafter worked up as described in Example XII. The reaction product was recrystallized form methanol, yielding 1.5 gm. of a colorless crystalline substance having a melting point of 204–205° C.

(d) Conversion of (4,2'-dihydroxy-diphenyl)-(pyridyl-2)-methane into (4,2'-diacetoxy-diphenyl)-(pyridyl-2)-methane:

A mixture of 5 gm. (4,2'-dihydroxy-diphenyl)-(pyridyl-2)-methane, 10 gm. sodium acetate and 25 cc. acetic acid anhydride was heated for about three hours on a water bath. The reaction mixture was allowed to cool, whereupon it was diluted with 200 cc. water and the aqueous solution neutralized with sodium carbonate. A colorless precipitate formed which was filtered off and recrystallized from methanol, yielding 4.5 gm. of a colorless crystalline substance having a melting point of 105°–107° C.

EXAMPLE XIV

*(4,2'-dihydroxy-diphenyl - (6-methyl-pyridyl-2)-methane*

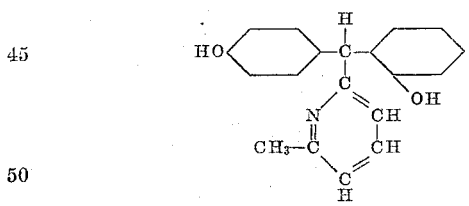

(a) Production of (2-methoxy-phenyl)-(6-methyl-pyridyl-2)-carbinol used as starting material:

Proceeding as described under (a) in Example XIII but using 16 gm. 6-methyl-pyridine-2-aldehyde in place of pyridine-2-aldehyde, the corresponding carbinol was obtained in the form of colorless crystals having a melting point of 143° C. The yield was 23 gm.

(b) Production of (4-hydroxy-2'-methoxy-diphenyl)-(6-methyl-pyridyl-2)-methane:

By reacting similar amounts of phenol and (2-methoxy-phenyl)-(6-methyl-pyridyl-2)-carbinol in the presence of concentrated sulfuric acid, as disclosed under (b) in Example XIII, 4 gm. of (4-hydroxy-2'-methoxy-diphenyl)-(6-methyl-pyridyl-2)-methane were obtained. When recrystallized from methanol, the crystalline product had a melting point of 222°–223° C.

(c) Conversion of (4-hydroxy-2'-methoxy-diphenyl)-(6-methyl-pyridyl-2)-methane into (4,2'-dihydroxy-diphenyl)-(6-methyl-pyridyl-2)-methane:

2 gm. (4-hydroxy-2'-methoxy-diphenyl)-(6-methyl-pyridyl-2)-methane were heated for one hour with 25 cc. of a 48% hydrobromic acid solution, and then worked up as described in Example XII. The reaction product was recrystallized from methanol, yielding 1.5 gm. of a crystalline substance having a melting point of 223° C. A mixture of (4-hydroxy-2'-methoxy-diphenyl)-(6-methyl-pyridyl-2)-methane and the present reaction product had a melting point of 205° C.

We have further found that the 4,2'-dioxy-diphenyl-pyridyl-methane compounds of the above general class of compounds possess pronounced laxative effect, which could not be anticipated since it was heretofore believed that the laxative characteristics of compounds derived from diphenylmethane was predicated upon the presence of two phenolic hydroxyl groups in 4,4'-positions; see Kaufmann, "Arzneimittelsynthese," p. 260, published by Springer-Verlag, Berlin, Germany (1953).

The laxative effects of the following compounds were tested on rats. The following results were obtained.

| Compound: | Effective dosage mg./kg. |
|---|---|
| (4-hydroxy-4'-methoxy-diphenyl) - (pyridyl-2)-methane | 15 |
| (4-hydroxy - 4' - methoxy-diphenyl) - (6-methyl-pyridyl-2)-methane | 30 |
| (4,2-dihydroxy-diphenyl) - (pyridyl-2)-methane | 75 |
| (4,2' - diacetoxy - diphenyl) - (pyridyl - 2)-methane | 18 |

For use as laxatives, the compounds above referred to are most advantageously administered together with an inert carrier such as lactose, glucose, starch and the like to form tablets enteric coated or in capsules which do not dissolve in the stomach but only in the intestinal tract.

While we have illustrated the present invention with the aid of certain specific embodiments, we wish it to be understood that the invention is not limited to these embodiments, and it will be apparent to persons skilled in the art that various changes and modifications may be made without departing from the spirit of the invention or the scope of the appended claims.

We claim:
1. The process of producing (4,2'-dihydroxy-diphenyl)-(pyridyl-2)-methane, which comprises subjecting (2-methoxy-phenyl)-(pyridyl-2)-carbinol to a condensation reaction with phenol at substantially room temperature in the presence of sulfuric acid as a dehydrating agent, and thereafter demethylating the condensation product with hydrobromic acid.

2. The process of producing (4,2'-diacetoxy-diphenyl)-(pyridyl-2)-methane, which comprises subjecting (2-methoxy-phenyl)-(pyridyl-2)-carbinol to a condensation reaction at substantially room temperature with phenol in the presence of sulfuric acid as a dehydrating agent to form (4-oxy-2'-methoxy-diphenyl)-(pyridyl-2)-methane, demethylating the condensation product with hydrobromic acid to form (4,2'-dihydroxy-diphenyl)-(pyridyl-2)-methane, and di-acetylating the hydroxyl groups with sodium acetate and acetic acid anhydride.

3. Asymmetrically substituted diphenyl-(pyridyl-2)-methane compounds having the structural formula

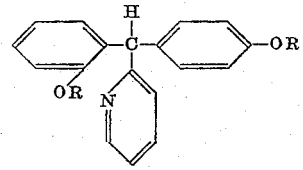

wherein R is selected from the group consisting of hydrogen and lower alkanoyl.

4. (4,2'-diacetoxy-diphenyl)-(pyridyl-2)-methane.
5. (4,2'-dihydroxy-diphenyl)-(pyridyl-2)-methane.

References Cited in the file of this patent

UNITED STATES PATENTS

| 2,606,195 | Tilford et al. | Aug. 5, 1952 |
| 2,764,590 | Kottler et al. | Sept. 25, 1956 |

FOREIGN PATENTS

| 518,457 | Belgium | Mar. 31, 1953 |

OTHER REFERENCES

Tschitchibabin et al.: Ber. Deut. Chem., vol. 61, pp. 547–57 (1928).